Figure 1:
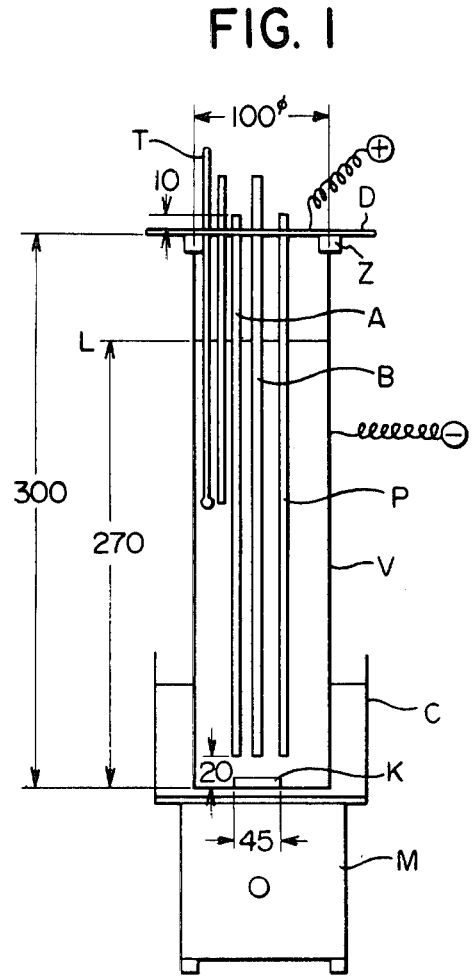

United States Patent [19]

Tominaga et al.

[11] 4,287,041

[45] Sep. 1, 1981

[54] PROCESS FOR ELECTRODEPOSITION OF CATIONIC RESINS

[75] Inventors: Akira Tominaga; Reijiro Nishida, both of Hiratsuka, Japan

[73] Assignee: Kansai Paint Co., Ltd., Japan

[21] Appl. No.: 142,167

[22] Filed: Apr. 14, 1980

Related U.S. Application Data

[62] Division of Ser. No. 78,909, Sep. 25, 1979.

[30] Foreign Application Priority Data

Dec. 29, 1978 [JP] Japan .................... 53-162280

[51] Int. Cl.³ ............................................ C25D 13/06
[52] U.S. Cl. ................................................ 204/181 C
[58] Field of Search .................................. 204/181 C

[56] References Cited

U.S. PATENT DOCUMENTS 4,036,795  7/1977  Tominaga ............... 204/181 C
4,134,866  1/1979  Tominaga et al. ...... 204/181 C Primary Examiner—Howard S. Williams
Attorney, Agent, or Firm—Wenderoth, Lind & Ponack

[57] ABSTRACT

An acid-neutralizable cationic electrodepositable resin composition comprising as a film-forming ingredient the reaction product of (A) an epoxy resin or an adduct of an epoxy resin with a primary amine and/or a secondary amine,
(B) an amino-terminated condensation product between a maleinized fatty acid and a polyamine, and
(C) a partially blocked polyisocyanate compound.

The composition can form a cathodically electrodepositable aqueous bath by being neutralized with an acid, and can give a coated film having superior surface smoothness and corrosion resistance with a high throwing power.

2 Claims, 4 Drawing Figures

PROCESS FOR ELECTRODEPOSITION OF CATIONIC RESINS

This is a division of application Ser. No. 078,909, filed Sept. 25, 1979.

This invention relates to a novel cationic electrodepositable resin composition, and more specifically, to a cationic electrodepositable resin composition which can form a cathodically electrodepositable aqueous bath by being neutralized with an acid, and which can give a coated film having superior surface smoothness and corrosion resistance with a high throwing power.

Various cationic electrodepositable compositions have been suggested in the past. For example, Japanese Published Examined Patent Application No. 25488/75 discloses an electrodeposition coating composition which is a dispersion in an aqueous medium of particles of a coating material composed of an amino-containing addition polymer or polycondensate (including amino-containing polyamides) and a blocked polyisocyanate (a wholly blocked isocyanate resulting from the blocking of substantially all of the isocyanate groups). An electrodeposited film prepared from this composition does not have satisfactory corrosion resistance, and the above Published Application states that in order to remedy this defect, not more than 50% by weight, based on the composition, of a polyepoxide may be included in the composition. However, it is difficult to retain the stability of the bath during continuous electrodeposition coating.

Japanese Published Unexamined Patent Application No. 759/72 discloses a method for electroplating using an aqueous bath of a composition consisting of a soluble polyamine resin (which is substantially an amino-containing polyamide) and a blocked polyisocyanate. This composition, however, is an electrodeposition coating composition which shows the same properties as the composition disclosed in the above-cited Japanese Published Examined Patent Application No. 25488/75.

It is widely known that a cured article of a polyepoxide such as a bisphenol A-epichlorohydrin type epoxy resin has superior corrosion resistance and adhesion. Moreover, a method has already been known to water-solubilize an adduct formed between an epoxy resin and a primary or secondary amine by neutralizing it with an acid. As an electrodeposition coating composition which utilizes these properties of the aforesaid polyepoxide or adduct, Japanese Published Unexamined Patent Application No. 103135/76, for example, discloses an aqueous electrodepositable composition comprising a mixture of such an epoxy resin-amine adduct as described above and a blocked polyisocyanate. An electrodeposited film prepared from this composition has superior corrosion resistance. However, since the composition contains a very small amount of plasticizing components, the surface smoothness of the resulting film and the stability of the electrodeposition bath (the property of the bath to maintain the homogenity of a coated surface, the thickness of the deposited film, the resistance properties of the coated film, etc. within the desired ranges without a particular defect, especially deterioration, in these properties) are unsatisfactory. Furthermore, the composition has a low throwing power in coating articles of complex profiles.

Japanese Published Examined Patent Application No. 6306/77 describes a self-curing electrodepositable aqueous coating composition comprising an epoxy resin, a primary amine and/or a secondary amine, and a partially blocked polyisocyanate. This composition can be regarded as an improvement over the composition described in the above-cited Japanese Published Unexamined Patent Application No. 103135/76. However, no sufficient improvement is provided by this composition in regard to the surface smoothness and flexibility of the coated film, and the stability and the throwing power of the coating composition, and the composition is not entirely satisfactory for industrial application.

Japanese Published Unexamined Patent Application No. 11228/77 discloses an aqueous composition for electrodeposition obtained by reacting an epoxy resin with a polyamine derivative containing a primary amino group and a secondary amino group blocked with ketimine groups, followed by the addition reaction of the resulting product with a partially capped polyisocyanate. This composition is similar to the composition described in the above-cited Japanese Published Examined Patent Application No. 6306/77, and is neither satisfactory.

In an attempt to remedy the defects of these conventional electrodepositable resin compositions, Tominaga, one of the coinventors of the present application, disclosed in Japanese Published Examined Patent Application No. 8568/78 a cationically electrodepositable resin composition prepared by mixing or reacting an amine-adduct of epoxy resin with an amino-containing polyamide, followed by the addition reaction of the product with a partially capped polyisocyanate. This resin composition provided marked improvements in the flexibility and corrosion resistance of electrodeposited films prepared from the resin composition, but it was still not entirely satisfactory with regard to the stability and throwing power of the electrodeposition bath.

In Japanese Published Unexamined Patent applications Nos. 77144/77 and 101238/77, the above-cited Tominaga disclosed a cationic electrodepositable resin composition comprising as a main ingredient a mixture of (1) the reaction product of at least two of (a) the reaction product between an epoxy resin and a basic amino compound, (b) a basic amino-containing polyamide and (c) a partially blocked isocyanate, with (2) the remaining component (a), (b) or (c). This resin composition provided more improvements than the composition described in Japanese Published Examined Patent application No. 8568/78 cited above. However, the properties of coated films electrodeposited from this resin composition do not completely meet all of the present most rigorous requirements of the market, and still leave room for improvement.

Japanese Published Unexamined Patent application No. 121640/77 discloses a technique of adding a polyether having specified properties to a resin composition comprising an amine-adduct of epoxy resin, a fatty acid or an amino-containing polyamide, and a partially blocked polyisocyanate, thereby markedly improving the surface smoothness of a coated film prepared from the composition without impairing its corrosion resistance. However, in continuous electrodeposition, this improved composition still leaves room for improvement in its throwing power.

Another possible approach for improvement would be to modify the epoxy resin used in electrodepositable resin compositions with a fatty acid, or to modify the polyisocyanate with a polyalkylene polyol. However, such methods have the defect of markedly deteriorating the corrosion resistance of films electrodeposited from the compositions obtained.

The present inventors made extensive investigations in order to improve the properties of cationic electrodepositable resin compositions further and to provide a novel electrodepositable resin composition which will fully meet the present demand of the market. These investigations have led to the discovery that when an amino-terminated condensation product formed between a maleinized fatty acid and a polyamine is used as a constituent ingredient of a cationic electrodepositable composition comprising a modified epoxy resin, the throwing power of the composition is markedly improved, and by the cooperative action of this ingredient and the modified epoxy resin component, the resin composition can afford a coated film having superior corrosion resistance and impact strength and improved surface smoothness with a markedly improved throwing power.

Thus, according to this invention, there is provided a cationic electrodepositable resin composition capable of forming a cathodically electrodepositable aqueous bath by neutralization with an acid (to be referred to simply as "acid-neutralizable"), said composition comprising as a film-forming ingredient the reaction product of the following three components:

(A) an epoxy resin or an adduct of an epoxy resin with a primary amine and/or a secondary amine [to be referred to as "component (A)"], (B) an amino-terminated condensation product between a maleinized fatty acid and a polyamine [to be referred to as "component (B)"], and (C) a partially blocked polyisocyanate compound [to be referred to as "component (C)"].

The order of reacting the components (A), (B) and (C) is not critical. For example, component (A) and component (C) are reacted, and the reaction product is further reacted with component (B). Or the components (A) and (B) are reacted, and the reaction product is further reacted with component (C). Or components (B) and (C) are reacted, and the reaction product is further reacted with component (A). It is also possible to react the reaction product of components (A) and (B), with the reaction product of components (B) and (C).

The components (A), (B) and (C) and the reactions of these components are described in greater detail below.

Component (A)

Epoxy resin

A suitable epoxy resin used in this invention is a polyepoxide containing at least two epoxy groups on an average per molecule. Advantageously, the polyepoxide has an average molecular weight of generally 150 to 6000, preferably 300 to 3000, and an epoxy equivalent of generally 75 to 3000, preferably 150 to 1500. Examples of the epoxy resin are an epoxy resin obtained from bisphenol A and epichlorohydrin and an epoxy resin obtained from hydrogenated bisphenol A and epichlorohydrin or β-methylepichlorohydrin. The epoxy resin obtained by the addition reaction of bisphenol A with epichlorohydrin (the bisphenol A type) is preferred. There can also be used epoxy resins which are obtained by the addition reaction of phenol derivatives such as 4,4'-bisphenol-methane, 1,1-bis(4'-hydroxyphenyl)ethane, 1,1-bis(4'-hydroxyphenyl)isobutane, 2,2-bis(4'-hydroxy tert.butylphenyl)propane, bis(2-hydroxynaphthyl)methane and 1,5-dihydroxynaphthylene used instead of bisphenol A or hydrogenated bisphenol A with epichlorohydrin or β-methylepichlorohydrin.

These epoxy resins are used singly, or if desired, in combination with at least one of the following compounds.

(a) Polyglycidyl ether of novolak resin
(b) Polyglycidyl ethers of epichlorohydrin with polyhydric alcohols such as ethylene glycol, propylene glycol, glycerol and trimethylolpropane
(c) Polyglycidyl esters of epichlorohydrin with polycarboxylic acids such as adipic acid, phthalic acid or dimeric acid
(d) Polyepoxides obtained by epoxidizing alicyclic olefins or 1,2-polybutadiene When these compounds are used jointly, they are used in an amount of not more than 50% by weight, preferably not more than 25% by weight, based on the epoxy resin.

Adduct of an epoxy resin with a primary amino and/or a secondary amine

The epoxy resin used in this invention can be modified by addition reaction with amines containing at least one active hydrogen, i.e. compounds containing at least one primary amino group or at least one secondary amino group (this modification product will be referred to hereinbelow as an "amine-added epoxy resin").

Suitable amines that can be used to modify the epoxy resins are water-soluble mono- or di-functional aliphatic monoamines or polyamines preferably having not more than 10 carbon atoms, more preferably not more than 6 carbon atoms. Polyamines containing at least two primary amino groups ($—NH_2$) can also be used. In this case, the polyamine is rendered monofunctional or di-functional by blocking a part of the primary amino groups with a ketone (e.g., acetone, methyl ethyl ketone, methyl isobutyl ketone, or cyclohexanone), or an aldehyde (e.g., acetaldehyde, benzaldehyde or furfural) prior to addition reaction with the epoxy resin.

Examples of the amines capable of addition reaction with the epoxy resins include lower alkylamines such as diethylamine, isopropylamine, diisopropylamine and n-butylamine, and mono- or di-hydroxy lower alkanolamines such as monoethanolamine, diethanolamine, N-hydroxyethyl ethylenediamine, N,N-dihydroxyethyl ethylenediamine, diisopropanolamine, and monoisopropanolamine.

In the present specification and the appended claims, the term "lower" used to qualify groups or compounds means that the groups or compounds so qualified have up to 6, preferably 4, carbon atoms.

Other examples of the usable amines include alicyclic monoamines such as cyclohexylamine, pyrrolidine and morpholine; mono- or di-functional amines obtained by the condensation of primary polyamines such as ethylenediamine, hexamethylenediamine, diethylenetriamine, propylenediamine, dipropylenetriamine and butylenediamine with ketones such as acetone or methyl ethyl ketone or aldehydes such as formaldehyde, acetaldehyde or butyraldehyde; and mono- or di-functional polyamines such as N,N'-diethyl ethylenediamine, N,N'-diethylaminopropylamine, piperazine, N-methylpiperazine or N-aminomethylpiperazine. These amines may be used singly, or together with the aforesaid alkylamines and/or alkanolamines.

The aforesaid alkylamines and/or alkanolamines may also be used jointly with aromatic amines such as aniline, N-methylaniline, toluidine, benzylamine, m-xylylenediamine, m-phenylenediamine and 4,4'-diaminodiphenylmethane. When the aromatic amine is used, its amount is preferably not more than about 5 mole% based on the total amount of amines, preferably within a range which does not cause loss of the water dispersibility of the final reaction product when it is neutralized with an acid, for example not more than 25 mole% based on the total amount of amines.

The addition reaction of the epoxy resin with the primary amine and/or the secondary amine takes place generally upon mixing of these materials at room temperature. To complete this reaction, it is preferably carried out at a temperature of 20° to about 200° C., especially at 50° to 150° C. for about 1 to 10 hours in the final stage.

The amount of the primary amine and/or the secondary amine to be reacted with the epoxy resin is less than 1 mole, preferably 0.5 to 0.9 mole, per equivalent of the epoxy groups of the epoxy resin.

In the reaction of the epoxy resin with the amine, an organic solvent may be added in order to reduce the viscosity of the reaction mixture and facilitate the reaction. Suitable organic solvents include the following.

(a) Secondary or tertiary alcohols having not more than 10 carbon atoms, preferably not more than 6 carbon atoms, such as isopropanol, sec-butanol, tert-butanol and propylene glycol monomethyl ether.

(b) Ketones having not more than 10 carbon atoms, preferably not more than 6 carbon atoms, such as methyl ethyl ketone, methyl isobutyl ketone, diisobutyl ketone, diacetone alcohol, diacetone alcohol methyl ether (also called Pentoxone), and cyclohexanone.

(c) Ethers containing up to 10 carbon atoms, preferably not more than 6 carbon atoms, such as dioxane, ethylene glycol dimethyl ether and diethylene glycol dimethyl ether.

The amine-added epoxy resin used as component (A) in this invention may have an amine value of generally 25 to 500, preferably 50 to 250. The "amine value", as used herein, has the meaning to be described hereinbelow.

Component (B)

The present invention has the novel feature that the "amino-terminated condensate between a maleinized fatty acid and a polyamine" is used in combination with the component (A), i.e., the epoxy resin or the amine-added epoxy resin.

The maleinized fatty acid is obtained by reacting a fatty acid with maleic anhydride or its reactive derivative such as maleate esters, maleimide or maleic amide. Examples of the fatty acid are drying or semidrying oil fatty acids containing 12 to 18 carbon atoms and having an iodine value of at least 100, preferably 130 to 200 which are contained in oils extracted from the fruits, seeds, etc. of plants, specifically tung oil fatty acid, linseed oil fatty acid, perilla oil fatty acid, dehydrated castor oil fatty acid, safflower fatty acid, tall oil fatty acid, cotton seed oil fatty acid, sesame oil fatty acid, colza oil fatty acid, and soybean oil fatty acid. Maleinization of these fatty acids can be carried out in a known manner. For example, the reaction temperature is preferably about 150° C. to about 250° C. Desirably, the maleinization reaction is carried out by mixing the fatty acid with maleic anhydride at an elevated temperature for 1 to 10 hours in the presence of a small amount of an aromatic hydrocarbon solvent such as toluene or xylene, and reacting them until the amount of free maleic anhydride in the reaction mixture is less than 1%. The amount of the maleic anhdride to be reacted with the fatty acid is such that the maleinized fatty acid synthesized under the above-mentioned reaction conditions does not become extremely viscous or is not gelled in a subsequent reaction with the polyamine. Specifically, the maleic anhydride is used in an amount of not more than 1 mole, preferably 0.5 to 0.9 mole, per mole of the fatty acid.

The maleinized fatty acid so obtained has a total acid value of generally 250 to 500, preferably 300 to 400, and a half acid value of generally 150 to 350, preferably 200 to 300. The terms "total acid value" and "half acid value", as used herein, have the meanings to be described hereinbelow.

To obtain component (B), the maleinized fatty acid is reacted with the polyamine in an aromatic hydrocarbon solvent such as toluene or xylene until the acid value of the reaction product becomes not more than 5. The desirable reaction temperature is about 150° to about 200° C.

Suitable polyamines for use in this reaction are polyamines having at least two, preferably 2 to 5, amino groups at least one, preferably 1 to 3, of which is a primary amino group, and advantageously having 2 to 10 carbon atoms, preferably 2 to 8 carbon atoms. Especially suitable are polyalkylene polyamines having 2 to 8 carbon atoms and 2 to 5 amino groups, such as ethylenediamine, N-hydroxyethylethylenediamine, diethylenetriamine, triethylenetetramine, tetraethylenepentamine, and hexamethylenediamine.

In order to avoid gellation in this reaction, it is possible to imidize or amidate the acid anhydride group

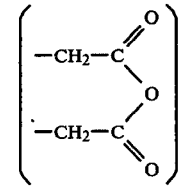

of the maleinized fatty acid with a monoamine containing one primary or secondary amino group such as monoethanolamine, diethanolamine or diethylamine prior to reaction with the polyamine. Alternatively, in the maleinization of the fatty acid, maleinimide or maleic amide may be used instead of maleic anhydride.

The amount of the polyamine to be reacted with the maleinized fatty acid is about 0.8 to 1.2 moles per equivalent of the carboxyl group in the maleinized fatty acid. This can yield a condensation product having terminal amino groups.

When the primary amino-terminated condensation product is to be reacted with the reaction product of component (A) and component (C), it is desired to protect the primary amino groups remaining in the condensation product, thereby leaving sufficient amounts of terminal amino groups for solubilization with an acid. For this purpose, a method may be employed which comprises adding a ketone such as acetone, methyl ethyl ketone or methyl isobutyl ketone to the condensation product, heating the mixture under reflux, and performing the condensation reaction until there is substantially no more water distilled. If required, this reaction is preferably carried out at a temperature of 20° to 200° C. in the presence of an aromatic hydrocarbon solvent such as toluene or xylene, and finally, the solvent is removed under reduced pressure. The component (B) so prepared has an amine value of generally 50 to 500, preferably 100 to 400, and an acid value of generally not more than 10, preferably not more than 5.

Component (C)

The partially blocked polyisocyanate compound used in this invention is a polyisocyanate compound having at least 1, preferably 1 to 2, blocked isocyanate groups and more than 0 but not more than 1.5, preferably 0.5 to 1.0, free isocyanate group, per molecule on an average. Suitable polyisocyanate compounds that can be used to produce the partially blocked polyisocyanate compounds are those having an NCO value of about 100 to about 1000, preferably about 200 to about 600. Examples of such polyisocyanate compounds include aromatic or aliphatic diisocyanates such as m- or p-phenylene diisocyanate, 4,4'-diphenylmethane diisocyanate, 2,4- or 2,6-tolylene diisocyanate, m- or p-xylylene diisocyanate, hexamethylene diisocyanate, dimeric acid diisocyanate and isophorone diisocyanate; addition products formed between an excessive equivalent weight of these diisocyanates and polyols such as ethylene glycol, propylene glycol, polypropylene glycol, glycerol, trimethylol propane and pentaerythritol; and polyisocyanates such as the trimers of the aforesaid diisocyanates.

Blocking agents that can be used to form the partially blocked polyisocyanates are volatile low-molecular-weight active hydrogen containing compounds advantageously having a boiling point of not more than about 250° C., especially not more than 200° C., and a molecular weight of generally not more than 200, preferably not more than 150. Specific examples of these blocking agents include aliphatic or araliphatic monoalcohols having 1 to 8 carbon atoms such as methanol, ethanol, propanol, isopropanol, n-butanol, tertiary butanol, hexanol, cyclohexanol, benzyl alcohol, ethylene glycol monoethyl ether (also known as Cellosolve) and ethylene glycol monobutyl ether; hydroxy-containing tertiary lower-alkyl amines such as dimethylaminoethanol or diethylaminoethanol; lower alkyl ketone oximes such as acetoxime and methyl ethyl ketone oxime; active methylene compounds such as acetylacetone, acetoacetate esters and malonate esters; lactams such as ε-ceprolactam; and phenols such as phenol or cresol. Of these, aliphatic monoalcohols are especially preferred because of their freedom from offensive odors and toxicity at the time of baking the electrodeposited films.

The partially blocked polyisocyanate that can be used in this invention is obtained by reacting the polyisocyanate in a manner known per se with the blocking agent in an amount required for the polyisocyanate to contain more than 0 but not more than 1.5, preferably 0.5 to 1, free isocyanate group on an average per molecule. Since this reaction is extremely exothermic, it is preferably carried out while adding the blocking agents in small drops to the polyisocyanate. The reaction is carried out at a relatively low temperature of 20° to 80° C. so as to increase the difference in reactivity among the isocyanate groups in one molecule.

The partially blocked polyisocyanate compound so obtained may have an isocyanate value of 50 to 500, preferably 100 to 300. The term "isocyanate value", as used herein, has the meaning to be described hereinbelow.

Reaction between components (A) and (B)

In the present invention, the component (A) may be directly reacted with the component (B). Alternatively, the component (A) may be reacted with component (B) after first reacting it with component (C) to form an epoxy resin or amine-added epoxy resin containing partially blocked isocyanate groups.

The reaction between the components (C) and (A) can be performed by contacting the two in a customary manner in the absence of a solvent, or in the presence of a suitable solvent such as toluene, t-butanol, dioxane, methyl ethyl ketone or ethyl acetate.

To avoid dissociation of the blocking groups from the blocked isocyanate groups owing to abrupt generation of heat and incident gellation, it is desirable to add the partially blocked polyisocyanate compound in small drops. The suitable reaction temperature is generally 20° to 120° C.

The amount of the partially blocked polyisocyanate compound to be reacted is not critical, and may be that which is sufficient for curing coated films from the final reaction product under heat. Preferably it is equal to, or less than, the equivalent weight of active amino groups and hydroxyl group present in the molecules of the final reaction product which are to be reacted with the free isocyanate groups in the partially blocked polyisocyanate compound. Specifically, the suitable amount of the partially blocked polyisocyanate compound is generally 10 to 100% by weight, preferably 25 to 75% by weight, based on the component (A).

As a result, the reaction product of components (A) and (C) [to be referred to as the "reaction product (A-C)"], i.e. an epoxy resin or amine-added epoxy resin containing partially blocked isocyanate groups, is obtained.

Reaction of component (A) or reaction product (A-C) with component (B), and the reaction of component (C) with the reaction product of components (A) and (B)

These reactions can be performed under the same conditions as described hereinabove with regard to the addition reaction between the epoxy resin and the primary amine and/or the secondary amine. The reaction can be performed, for example, by mixing the component (A) or the reaction product (A-C) with the component (B) in the same organic solvent as described hereinabove with regard to the addition reaction, and reacting the mixture at a temperature of about 20° to about 200° C., preferably 50° to 150° C., for about 1 to about 10 hours.

The proportions of the component (A) or the reaction product (A-C) and the component (B) are not critical, and can be varied over a wide range according to the types of these components. Preferably, the compound (B) is used in an amount of generally 10 to 100% by weight, preferably 25 to 75% by weight, based on the component (A) or the reaction product (A-C).

When component (A) is reacted with component (B), the reaction product [to be referred to as the "reaction product (A-B)"] is then reacted with component (C). The resulting reaction product (A-B) has an amine value of generally 25 to 750, preferably 50 to 150.

The reaction of the reaction product (A-B) with the component (C) can be carried out under the same conditions as described hereinabove with regard to the reaction of the components (A) and (C). Advantageously, the component (C) is reacted in an amount of generally 10 to 100% by weight, preferably 25 to 75% by weight, based on the reaction product (A-B).

Reaction of the components (B) and (C), and the reaction of the resulting product with the component (A)

The reaction of the components (B) and (C) can be carried out by contacting them with each other in a customary manner in the absence or presence of a suitable solvent in accordance with the aforesaid procedure of reacting the component (C) with the amine-added epoxy resin.

Since the above reaction is exothermic, it is desirable to add component (C) dropwise to the component (B) in order to avoid the dissociation of the blocking groups from the blocked isocyanate groups owing to the abrupt generation of heat, and incident gellation. The reaction temperature is generally 20° to 120° C., preferably 20° to 80° C.

The amount of the component (C) to be reacted with the component (B) is not critical, and may be that which is sufficient to cure a coated film from the final reaction product under heat. Preferably, it is equal to, or less than, the equivalent weight of amino groups and hydroxyl group present in the molecules of the final reaction product to be reacted with the free isocyanate groups in the component (C). Specifically, the amount of the compound (C) to be reacted is generally 10 to 100% by weight, preferably 25 to 75% by weight, based on the component (B).

As a result, an amino-terminated condensation product containing partially blocked isocyanate groups, i.e. a reaction product (B-C), can be obtained.

The resulting reaction product (B-C) can then be reacted with the component (A). The reaction of the reaction product (B-C) with the component (A) can be carried out in the same way as described hereinabove with regard to the reaction of components (A) and (B). Advantageously, the amount of component (A) is generally 10 to 70% by weight, preferably 30 to 50% by weight, based on the reaction product (B-C).

Reaction of the reaction product (A-C) with the reaction product (B-C)

The reaction product (A-C) may be reacted with the reaction product (B-C) in the absence or presence of a suitable inert solvent such as toluene, t-butanol, dioxane, methyl ethyl ketone or ethyl acetate to provide the film-forming ingredient of the resin composition of this invention.

The proportions of the reaction product (A-C) and the reaction product (B-C) are such that the proportion of the former is 30 to 90% by weight, preferably 50 to 80% by weight, and the proportion of the latter is generally 70 to 10% by weight, preferably 50 to 20% by weight. The reaction temperature is 20° to 120° C., preferably 30° to 80° C., and the reaction time is generally 0.5 to 6 hours.

Cationic electrodepositable resin composition and the method of electrodeposition The reaction product of components (A), (B) and (C) [to be referred to as the reaction product (A-B-C)] contains in the molecules amino groups in an amount sufficient to solubilize and disperse the reaction product in water by neutralization with an acid. The reaction product (A-B-C) may have an amine value of generally 25 to 200, preferably 50 to 100.

Accordingly, this reaction product can be used as a film-forming ingredient in a cationic electrodepositable resin composition.

The reaction product (A-B-C) may be directly dissolved or dispersed in water to form a clear electrodepositable composition in accordance with this invention. Generally, however, additives such as pigments are incorporated.

Pigments conventionally added to electrodeposition coating compositions can all be used. Examples of the pigments include colored pigments such as red iron oxide, titanium white and carbon black, extender pigments such as talc, clay and mica, and rust-proofing pigments such as lead chromate, strontium chromate and lead silicate. These pigments may be used in usual amounts, advantageously in an amount of 1 to 10% by weight based on the weight of the composition. Salts of lead, tin, bismuth, iron, and manganese with organic or inorganic acids may be added as curing promotors. Usually, the composition of this invention does not require a surface-active agent. If desired, a small amount of a known surfactant such as a nonionic surfactant normally used in cationic electrodeposition coating compositions may be added.

The electrodepositable resin composition of this invention prepared in the above manner can be formed into a stable aqueous bath for electrodeposition by neutralizing it with an acid, for example, an aqueous solution of a water-soluble organic or inorganic acid such as formic acid, acetic acid, hydroxyacetic acid, propionic acid, butyric acid, lactic acid, phosphoric acid, sulfuric acid or hydrochloric acid. Preferably, the amount of the acid required for neutralization is at least that which is sufficient to dissolve the resinous reaction product (A-B-C) as a film-forming component of the composition of this invention in an aqueous medium or to disperse it finely in the aqueous medium, but not more than that which is required to neutralize completely the amino groups present in the above reaction product. Specifically, the preferred amount of the acid is about 0.1 to about 0.6% by weight based on the amine value of the resinous reaction product (A-B-C). In regard to the pH of the resulting aqueous bath, it is advantageous to neutralize the composition such that the pH of the resulting aqueous bath is generally about 3 to about 8, preferably about 5 to about 7.

A suitable aqueous medium that can be used to form the aqueous bath is water (preferably deionized water) or a mixture of water and a water-miscible organic solvent which has a water-content of at least 50% by weight. Examples of the water-miscible organic solvent are ethanol, isopropanol, sec-butanol, ethylene glycol monoethyl ether, diethylene glycol monobutyl ether, Pentoxone, Pentoxone, and ethylene glycol monoethylene ether acetate (Cellosolve acetate).

The total concentration of the resin solids in the resulting aqueous bath is generally 3 to 30% by weight, preferably 5 to 15% by weight.

The aqueous bath for electrodeposition so prepared can be used as a cathodically electrodepositable coating bath in depositing the resin composition on various articles as a cathode.

Methods and apparatuses which have been used heretofore in cathodic electrodeposition can be used to perform electrodeposition from this aqueous bath. Desirably, an article to be coated is used as a cathode, and a carbon plate, as an anode. The electrodeposition coating conditions are not particularly limited. Generally, the electrodeposition coating is desirably performed under the following conditions.

Temperature of the bath: 20° to 30° C.
Voltage: 100 to 400 V (preferably 200 to 300 V)
Current density: 0.01 to 3 A/dm$^2$
Time during which an electric current is passed: 1 to 5 minutes
Ratio of the area of the anode to that of the cathode: 2:1 to 1:2
Distance between the electrodes: 10 to 100 cm
Condition of the bath: agitated The coated film deposited on the cathodic article is washed, and then cured by baking it at about 140° to about 250° C., preferably about 170° to about 200° C. During the baking process, the blocked isocyanate groups present in the resin of the coated film releases the blocking agent such as alcohol, and is crosslinked with amino groups, amide groups, hydroxyl groups, etc. present in the resin.

The electrodepositable resin composition provided by this invention can be used to coat various metallic articles. It can be applied to an ordinary steel substrate treated with zinc phosphate, and is especially suitable for application to steel substrates which are susceptible to corrosion, such as steel substrates treated with iron phosphate or bare steel substrates. By using the composition of this invention, a coated film having outstanding corrosion resistance can be applied to these steel substrates with a superior throwing power. This is a marked advantage which cannot be achieved by conventional electrodeposition coating compositions. The composition of this invention is also suitable for electrodeposition coating of other substrates such as zinc plated steel plates, tin-plated steel plates, aluminum, copper and copper alloys to provide a coated film having superior corrosion resistance and other properties with a superior throwing power.

The following Examples and Comparative Examples illustrate the present invention more specifically. It should be understood that the scope of the present invention is in no way limited by these examples.

In these examples, all parts are parts by weight.

The amine value, total acid value, half acid value, isocyanate value and throwing power were measured by the following methods.

(1) Amine value

A sample (0.2 to 0.3 g) is taken into a 100 ml. Erlenmeyer flask, heated to form a solution, and cooled. The solution is then titrated with N/10 aqueous HCl solution using bromophenol blue as an indicator. The end point is regarded as the time when the solution turns from blue to yellow. The amine value is calculated in accordance with the following equation.

Amine value =
$$\frac{\text{Amount (ml) of N/10 HCl used in titration} \times \text{Potency of N/10 HCl}}{\text{Amount (g) of sample} \times \text{solids (\%)}/100} \times 5.61$$

(2) Total acid value

A sample (0.2 to 0.3 g) is accurately weighed, and about 25 ml of a mixture of pyridine (chemical pure, reagent grade) and distilled water in a weight ratio of 10:1 is added the sample. The mixture is heated, boiled for 2 to 3 minutes, and then cooled. It is then titrated with a N/10 alcoholic potassium hydroxide solution using phenolphthalein as an indicator. The total acid value is calculated in accordance with the following equation.

Total acid value =
$$\frac{\text{Amount (ml) of N/10 HCl used in titration} \times f \times 5.61}{\text{Amount (g) of the sample} \times \frac{\text{solids (\%)}}{100}}$$

where in f is the factor of the N/10 alcoholic potassium hydroxide solution.

(3) Half acid value

A sample (0.2 to 0.3 g) is accurately weighed, and about 25 ml of a mixture of 99% ethanol/toluene (1/1 by weight) previously neutralized is added. The mixture is heated to its boiling point. When it boils, the solution is immediately cooled, and titrated with a N/10 alcoholic potassium hydroxide solution using phenolphthalein as an indicator. The half acid value is calculated in accordance with the following equation.

Half acid value =
$$\frac{\text{Amount (ml) of N/10 HCl used in titration} \times f \times 5.61}{\text{Amount (g) of the sample} \times \frac{\text{solids (\%)}}{100}}$$

wherein f is the factor of the N/10 alcoholic potassium hydroxide solution.

(4) Isocyanate value

About 0.5 g of a sample having isocyanate groups (NCO) is accurately weighed, and placed in a flask with a ground stopper. It is then dissolved in 10 ml of dioxane (chemical pure, reagent grade). Then, 10 ml of a 2/10 N dioxane solution of dibutylamine is accurately added. The mixture is heated at 80° C. for 30 minutes with shaking. Then, 100 ml of isopropyl alcohol (chemical pure, reagent grade) is added, and the excess of dibutylamine is titrated with 1/10 N hydrochloric acid using bromophenol blue as an indicator until the blue color of the solution turns yellowish green. A blank test is also conducted without adding the sample.

The NCO value is calculated in accordance with the following equation.

$$\text{NCO value} = \frac{(A - B) \times 0.0042 f \times 1000}{W}$$

wherein
A is the amount (ml) of N/10 hydrochloric acid required to neutralize 2/10 N dibutylamine in the blank test;
B is the amount (ml) of N/10 hydrochloric acid used in the titration of the sample;
0.0042 is the amount (mg) of isocyanate groups corresponding to 1 ml of N/10 hydrochloric acid;
f is the factor of hydrochloric acid; and
W is the amount (g) of the sample.

(5) Testing method for throwing power (pipe method)

Figures 2, 3:
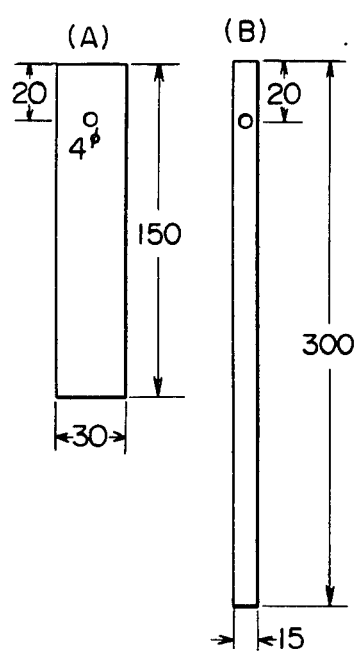
Figure 4:
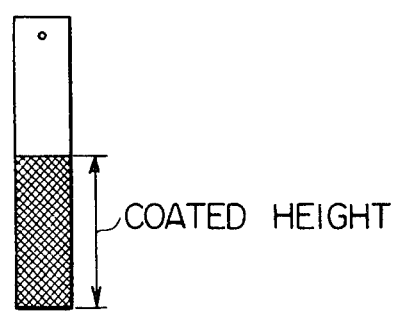

A testing device for throwing power is illustrated in FIGS. 1 to 4 of the accompanying drawings. In the drawings, the symbols represent the following parts.
V: a nonmagnetic stainless steel cylindrical vessel ($\phi = 100$ mm, $t = 1$)
Z: an insulator D: a supporting rod ($\phi=3$ mm, h=170 mm)
P: a nonmagnetic stainless pipe ($\phi=16$ mm, h=340 mm, t=1 mm)
A: an outside plate for measuring film thickness (30×150×0.8 mm) (see FIG. 2)
B: an inside plate for measuring throwing power (15×300×0.4 mm) (see FIG. 3)
T: a mercury thermometer (50° C. scale)
K: a rotator
C: a plastic water tank for cooling
M: a magnetic stirrer
L: the liquid level of the electrodeposition bath.

The procedure of operation is as follows:
(1) Place the sample into the stainless steel cylindrical vessel V shown in FIG. 1 to a height of L (27 cm) from the bottom. Adjust its temperature to a specified value (usually 30° C.), and stir it uniformly (the bath temperature 30° C.).
(2) Fit the outside plate A, pipe D and inside plate B into the support rod D, and put them into the vessel V.
(3) Set an anode and the cathode in place, and make sure that there is no short-circuiting.
(4) Increase the voltage over the course of 10 seconds from 0 to a predetermined point at which the film thickness on the outside plate becomes 20 to 25 microns. At this time, adjust the rate of increasing the voltage so that the current does not exceed 10 A.
(5) Turn off a switch after passing current for 3 minutes, and wash the outside plate, the inside plate and the pipe with water.
(6) Bake and dry the outside plate and the inside plate.
(7) Wash the pipe with a solvent in two stages. In particular, wash the inside surface of the pipe well.
(8) Measure the height of the coating on the inside plate (see FIG. 4).

EXAMPLE 1

Linseed oil fatty acid (280 parts) and 80 parts of maleic anhydride were dissolved in 5 parts of toluene, and reacted at 195° C. for 8 hours in a stream of nitrogen. Then, the reaction mixture was subjected to a pressure-reducing operation, and maleinized linseed oil fatty acid was prepared. The product had a total acid value of 400 and a half acid value of 280.

Xylene (30 parts) was added to the maleinized linseed oil fatty acid, and 50 parts of monoethanolamine was added dropwise to the mixture at room temperature. After the heat generation caused by the addition subsided, the mixture was heated at 80° C. for 1 hour. Then, 260 parts of triethylenetetramine was added dropwise. After the heat generation subsided, the mixture was heated. During the heating, water began to distill off at 140° C., and the temperature was raised to 200° C. in 4 hours. When the acid value of the product reached 5 or less, 53 parts of methyl isobutyl ketone was added for ketimine formation. While heating the mixture further, water formed was distilled off, and the reaction was completed in 10 hours. Then, the solvent was removed under reduced pressure. Thus, a ketiminized product (to be referred to as a "condensate B") of the amino-terminated condensate was obtained. The condensate B had an acid value of 0 and an amine value of 450.

Separately, 81.4 parts of sec-butanol was added dropwise at less than 50° C. to 174 parts of tolylene diisocyanate (a mixture of 80% of 2,4-tolylene diisocyanate and 20% of 2,6-tolylene diisocyanate), and they were reacted at 60° C. until the isocyanate value of the produce became 148. Thus, a partially blocked diisocyanate having a molar ratio (tolylene diisocyanate/sec-butanol) of 1:1.1 was obtained. This product is referred to as an "isocyanate C".

One hundred parts of bisphenol A type epoxy resin having an epoxy equivalent of 500 (EPIKOTE 1001, a trademark for a product of Shell Chemical Co., Japan) was dissolved in 60 parts of isopropyl alcohol, and 13.1 parts of diethanolamine was added. The mixture was maintained at 80° C. for 1.5 hours to form an amine-added epoxy resin (to be referred to as "resin A"). Fifty parts of the isocyanate C was added dropwise to the resin A at 60° C., and they were reacted at 60° C. for 2 hours. Then, 40 parts of the condendate B was added to the reaction mixture, and reacted at 80° C. for 1.5 hours. Twenty parts of Cellosolve was added to form a composition having a solids concentration of 71% and an amine value of 74.

The resulting composition (100 parts calculated as solids) was mixed with 2.0 parts of acetic acid, 200 parts of deionized water, 6.5 parts of diethylene glycol monobutyl ether (butyl carbitol), 4.6 parts of titanium white, 1.3 parts of carbon black, 3.3 parts of talc, and 2.0 parts of a lead dilicate pigment, andd they were ballmilled for 20 hours. Deionized water (422 parts) was added to the kneaded mixture to form a cationic electrodeposition bath having a solids concentration of about 15% and a pH of 6.8.

The coating bath was stirred in the open state at 30° C. for 1 day, and using this bath, electrodeposition was performed on a 0.8 mm thick zinc phosphate-treated steel plate and a 0.8 mm-thick bare (non-treated) steel plate by passing a direct current of 280 V (in the case of the treated steel plate) or 200 V (in the case of the bare steel plate) for 3 minutes at 30° C. The coated film was baked at 180° C. for 20 minutes to afford a cured coated film having a thickness of 20 to 22 microns. The properties of the coated films, and the throwing power of the bath determined by passing a direct current of 280 V for 3 minutes in a separate test were as follows:

The following results refer to those obtained with the zinc phosphate-treated steel plate unless otherwise specified.

(1) Impact strength (DuPont-type tester: ½ inch; weight 500 g; the maximum falling height which leads to cracking of the coated film):
Surface 50 cm minimum
Back side 50 cm
(2) Crosscut adhesion (100 squares each side measuring 1 mm are provided, and a cellophane adhesive tape is applied to the crosscut surface and then pulled off): 100/100 (no peeling)
(3) Erichsen value (the extrusion distance until cracking is noted in the coated film): more than 7 mm
(4) Corrosion resistance (JIS Z2371 Salt Spray Test using a spray of 5% NaCl aqueous solution)
840 hours no change
600 hours no change (bare steel plate)
(5) Surface smoothness: very good
(6) Throwing power: 22 cm

EXAMPLE 2

Tall oil fatty acid (280 parts) and 50 parts of maleic anhydride were dissolved in 20 parts of xylene, and reacted at 200° C. for 5 hours until the amount of free maleic anhydride became less than 1%. Then, 35 parts of xylene was added, and further 206 parts of diethylenetriamine was added. The mixture was maintained at 180° C. for 6 hours to perform dehydrocondensation to reduce the acid value of the product to less than 5. Then, 200 parts of methyl isobutyl ketone was added to the product, and reacted for 6 hours at 140° to 200° C. while distilling off water formed. Thus, an amino-terminated condensation product having an amine value of 420 (to be referred to as "condensate D") was obtained.

Separately, 90 parts of ethylene glycol monoethyl ether was added dropwise to 174 parts of tolylene diisocyanate at 40° to 60° C. over the course of 2 hours. They were reacted at this temperature until the isocyanate value of the product became 148. Thus, a partially blocked diisocyanate (to be referred to as "isocyanate E") was obtained.

On the other hand, 150 parts of a bisphenol A-type epoxy resin having an epoxy equivalent of 950 and an average molecular weight of about 1500 (EPIKOTE 1004, a trademark for a product of Shell Chemical Co., Japan) was dissolved under heat in 100 parts of sec-butanol. To the solution was added 160 parts (solids content 120 parts) of the condensate D, and they were reacted at 100° C. for 1 hour. Then, the temperature of the reaction mixture was adjusted to 50° C., and 80 parts of isocyanate E was added dropwise to afford a composition having an amine value of 75. To 140 parts (100 parts as solids) of this composition were added 1.6 parts of acetic acid, 1 part of lead acetate and 147.4 parts of deionized water to form an aqueous dispersion having a solids concentration of 40%.

The aqueous dispersion was diluted with 250 parts of deionized water to form a cationic electrodeposition coating bath having a solids content of 15% and a pH of 7.0. The bath was stirred in the open state for one day at 30° C. Using this bath, electrodeposition was performed on a 0.8 mm-thick zinc phosphate-treated steel plate and a 0.8 mm-thick bare steel plate as a cathode by passing a direct current of 300 V (in the case of the treated steel plate) or 250 V (in the case of bare steel plate) for 3 minutes at 30° C. The coating was baked at 180° C. for 20 minutes to afford a cured coated film having a thickness of 20 to 22 microns. The bath and the coated film had the following properties.

(1) Surface smoothness: very good
(2) Impact strength (weight 1000 g): surface 50 cm
(3) Erichsen value: more than 7 mm
(4) Corrosion resistance:
   960 hours, no change
   600 hours, no change (bare steel plate)
(5) Throwing power (300 V, 3 minutes): 24.5 cm

EXAMPLE 3

A bisphenol A-type epoxy resin (150 parts) having an epoxy equivalent of about 950 and an average molecular weight of about 1500 (EPIKOTE 1004) was dissolved in 100 parts of Cellosolve, and 7.3 parts of diethylamine was added. They were reacted at 80° C. for 1 hour to form a solution of an amine-added epoxy resin.

The same isocyanate E as used in Example 2 (80 parts) was added dropwise at room temperature to 160 parts (solids 120 parts) of the same condensate D as used in Example 2 to form a reaction product. The reaction product was added to the solution of amine-added epoxy resin, and they were reacted at 80° C. for 2 hours to afford a composition having an amine value of 70.

The composition (140 parts; 100 parts as solids) was formed into an aqueous dispersion in accordance with the same formulation and method as used in Example 2. The aqueous dispersion was then diluted with deionized water to form a cationic electrodeposition coating bath having a solids concentration of 15% and a pH of 6.9. The bath was stirred in the open state for 1 day at 30° C. Using this bath, electrodeposition was performed on a 0.8 mm-thick zinc phosphate-treated steel plate as a cathode by passing a direct current of 350 V for 3 minutes at 30° C. The coated film was washed with water and baked at 180° C. for 30 minutes to a form a cured coated film having a thickness of 20 to 22 microns.

The properties of the coated film and the throwing power of the bath were as follows:
(1) Surface smoothness: very good
(2) Impact strength (weight 1000 g):
   Surface 50 cm min
   Back side 50 cm min
(3) Erichsen value: more than 7 mm
(4) Corrosion resistance: no change after 1000 hours
(5) Throwing power: 26 cm

EXAMPLE 4

Forty parts of the condensate B prepared in Example 1 was dissolved in 30 parts of methyl ethyl ketone.

Isopropanol (4 parts) was added dropwise to 21 parts of a trimer of methylenebis-phenyl isocyanate at less than 40° C., and they were reacted at 50° C. until the isocyanate value of the product became 60. Thus, a partially blocked polyisocyanate was produced.

The partially blocked polyisocyanate was added dropwise to the solution of condensate B at 30° C. They were reacted further at 40° C. for 1 hour to form a product (a).

The product (a) was added to the reaction product of resin A and isocyanate C prepared in the same way as in Example 1, and they were reacted at 80° C. for 1 hour to afford a composition having an amine value of 65 and a solids content of 71%.

The composition was formed into a cationic electrodeposition coating bath having a solids concentration of about 15% and a pH of 6.5 in accordance with the same formulation and method as used in Example 1. The bath was stirred in the open state at 30° C. for 1 day. A 0.8 mm-thick zinc phosphate-treated steel plate as a cathode was placed in the bath, and a direct current of 300 V was passed through the bath at 30° C. for 3 minutes. The coated film was baked at 170° C. or 30 minutes to form a cured coated film having a thickness of 20 to 22 microns. The properties of the coated film and the throwing power of the bath were as follows:
(1) Surface smoothness: very good
(2) Impact strength (weight 500 g):
   Surface 50 cm min
   Back side 50 cm min
(3) Erichsen value: more than 7 mm
(4) Corrosion resistance: no change after 1000 hours
(5) Throwing power: 25 cm

COMPARATIVE EXAMPLE 1

One hundred parts of an epoxy resin having an epoxy equivalent of 500 (EPIKOTE 1001) was dissolved in 35 parts of Cellosolve acetate. To the solution were added 10.5 parts of diethanolamine and 7.3 parts of diethylamine, and the mixture was maintained at 80° C. for 2 hours. Dibutyltin laurate (0.8 part) was added to the resulting amine-added epoxy resin having an amine value of 90. Then, 56.8 parts of the same isocyanate E as shown in Example 2 was added dropwise at 60° C. over the course of 30 minutes. The mixture was further heated at 70° C. for about 1 hour until no free isocyanate group could be detected. Thus, an isocyanate-adduct having an amine value of 60 was obtained.

To 120 parts (solids content 100 parts) were added 5.1 parts of acetic acid and 144.9 parts of deionized water to prepare an aqueous dispersion having a solids content of 40%. The aqueous dispersion was diluted with deionized water to form a cationic electrodeposition coating bath having a solids concentration of 15% and a pH of 5.4.

A 0.8 mm-thick zinc phosphate-treated steel plate or a 0.8 mm-thick bare steel plate was dipped in the bath as a cathode, and a direct current of 280 V (in the case of the treated steel plate) or 250 V (in the case of bare plate) was passed for 3 minutes at 30° C. to perform electrodeposition. The coated film was baked at 180° C. for 20 minutes to form a cured coated film having a thickness of 20 microns. The properties of the coated film and the throwing power of the bath were as follows:

(1) Surface smoothness: poor (considerable cracking)
(2) Impact strength (weight 500 g): surface 20 cm
(3) Erichsen value: 2 mm
(4) Corrosion resistance:
 720 hours no change
 480 hours no change (bare steel plate)
(5) Throwing power (280 V, 3 minutes): 15 cm

COMPARATIVE EXAMPLE 2

Four hundred parts of an epoxy resin having an epoxy equivalent of 200 (EPIKOTE 828, a trademark for a product of Shell Chemical Co., Japan) was reacted with 140 parts of linseed oil fatty acid at 120° C. for 3 hours in the presence of 0.54 part of tetraethyl ammonium bromide as an esterification catalyst to form a product having an acid value of less than 1. To the product were added 160 parts of isopropyl alcohol and 158 parts of diethanolamine to form a product having an amine value of 120. The isocyanate E obtained in Example 2 (568 parts) was added dropwise to the reaction product at 60° C. over the course of 30 minutes. The mixture was heated to 70° C. and maintained at this temperature for 1 hour to afford an adduct having an amine value of 66. The adduct was formed into a cationic electrodeposition coating bath in accordance with the same formulation and method as employed in Comparative Example 1. Using this bath, electrodeposition was performed on a 0.8 mm-thick zinc phosphate-treated steel plate and a 0.8 mm-thick bare steel plate as a cathode by passing a direct current of 190 V (in the case of the treated plate) or 160 V (in the case of bare steel plate) at 30° C. for 3 minutes. The resulting coated film was baked at 180° C. for 20 minutes to form a cured coated film having a thickness of 20 microns. The properties of the coated film and the throwing power of the bath were as follows:

(1) Surface smoothness: slightly good
(2) Impact strength:
 Surface 50 cm min. (weight 500 g)
 Surface 30 cm (weight 1000 g)
(3) Erichsen value: 5 mm
(4) Corrosion resistance:
 240 hours no change
 120 hours no change (bare steel plate)
(5) Throwing power (190 V, 3 minutes): 10.5 cm

COMPARATIVE EXAMPLE 3

One hundred parts of EPIKOTE 1001 having an epoxy equivalent of 500 and a molecular weight of about 1000 was dissolved in 66 parts of sec-butanol, and 18.9 parts of diethanolamine was added. They were reacted at 80° C. for 2 hours. Then, 50 parts of a dimeric acid-type polyamide (Versaminde #115, a trademark for a product of Nippon General Mills Co., Ltd., Japan) was added, and the mixture was reacted at 100° C. for 1 hour. To the reaction product was added dropwise 51 parts of the isocyanate C used in Example 1, and the mixture was maintained at 60° C. for 1 hour to afford a resin composition containing a blocked isocyanate having a solids concentration of 77% and an amine value of 70. To 130 parts (100 parts as solids) of the resulting composition were added 3.0 parts of acetic acid, 227 parts of deionized water, 3.0 parts of carbon black, 6 parts of clay and 1.0 part of basic lead sulfate pigment, and the mixture was ball-milled for 20 hours. Then, 367 parts of deionized water was added to form a cationic electrodeposition coating bath having a solids concentration of 15% and a pH of 6.0. The coating bath was stirred at 30° C. for 1 day in the open state. Using this bath, electrodeposition was performed on a zinc phosphate-treated steel plate and a bare steel plate by passing a direct current of 220 V (in the case of the treated plate) or 160 V (in the case of bare steel plate) at 80° C. for 3 minutes. The coated film was baked at 180° C. for 20 minutes to a form a cured coated film having a thickness of 20 to 22 microns. The properties of this coated film and the throwing power of the bath were as follows:

(1) Impact strength (weight 500 g):
 Surface 50 cm min
 Back Side 40 cm
(2) Crosscut adhesion: 100/100 (no peeling)
(3) Erichsen value: more than 7 mm
(4) Corrosion resistance
 800 hours no change
 480 hours no change (bare steel plate)
(5) Surface smoothness: good (slightly inferior to Examples 1 and 2)
(6) Throwing power (220 V, 3 minutes): 18 cm

COMPARATIVE EXAMPLE 4

EPIKOTE 1004 (150 parts) having an epoxy equivalent of 950 and a molecular weight of about 1500 was dissolved in 106 parts of methyl ethyl ketone, and then 12.6 parts of diethanolamine was added. They were reacted at 90° C. for 2 hours. Then, 50 parts of a dimeric acid-type polyamide(Versamide #125, a trademark for a product of Nippon General Mills Co. Ltd., Japan) which had been dehydrocondensed with methyl isobutyl ketone at 150° to 200° C. for 8 hours was added to the reaction product, and they were further reacted at 90° C. for 1 hour. Then, 52.8 parts of the isocyanate E used in Example 2 was added dropwise at 60° C., and reacted at 60° C. for 2 hours to form a resinous product having an amine value of 50 and a solids concentration of 71%. To 140 parts (100 parts as solids) of the product was added 5 parts of polypropylene glycol having a molecular weight of about 2000 to form a resin composition. One hundred parts, as solids, of this composition was mixed with the same acid, water and pigment in the same proportions as in Comparative Example 3. They were kneaded and diluted to form a cationic electrodeposition coating bath having a solids concentration of 15% and a pH of 6.8. The bath was stirred in the open state at 30° C. for 1 day. Using this bath, electrodeposition was performed on a zinc phosphate-treated steel plate and a bare steel plate as a cathode by passing a direct current of 190 V (in the case of the treated plate) or 160 V (in the case of the bare steel plate) at 30° C. for 3 minutes. The coated film was baked at 180° C. for 20 minutes to form a cured coated film having a thickness of 20 to 22 microns. The properties of the cured coated film and the throwing power of the bath were as follows:

(1) Surface smoothness: very good
(2) Impact strength (weight 500 g): Surface 50 cm minimum
(3) Erichsen value: more than 7 mm
(4) Corrosion resistance:
   800 hours no change
   180 hours no change (bare steel plate)
(5) Throwing power (190 V, 3 minutes): 16 cm It is clearly seen from the above Examples and Comparative Examples that by using the composition of this invention for cationic electrodeposition, excellent results not obtainable with the prior art can be achieved in the throwing power of an electrodeposition bath and the surface smoothness and corrosion resistance of the coated surface, which are important characteristics in electrodeposition.

What is claimed is:

1. In a method of electrodeposition coating of an electrically conductive surface serving as a cathode which comprises passing an electric current across said cathode and an anode in contact with an aqueous electrodepositable composition; the improvement wherein said electrodepositable composition consists essentially of (i) as a film-forming ingredient, the reaction product of (A) an epoxy resin, or an adduct of an epoxy resin with a primary amine and/or a secondary amine, (B) an amino-terminated condensation product between a maleinized fatty acid and a polyamine, and (C) a partially blocked polyisocyanate, (ii) a water-soluble aqueous inorganic or organic acid as a neutralization agent for said reaction product (i), and (iii) an aqueous medium.

2. An article coated by the method of claim 1.

* * * * *